United States Patent
Seike et al.

(10) Patent No.: US 12,455,230 B2
(45) Date of Patent: Oct. 28, 2025

(54) LIQUID DETERIORATION DETERMINATION DEVICE AND HYDRAULIC UNIT

(71) Applicant: DAIKIN INDUSTRIES, LTD., Osaka (JP)

(72) Inventors: Hikaru Seike, Osaka (JP); Hirokazu Nakamura, Osaka (JP); Mineo Inoue, Osaka (JP); Kenji Ayado, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 215 days.

(21) Appl. No.: 17/587,140

(22) Filed: Jan. 28, 2022

(65) Prior Publication Data

US 2022/0146412 A1 May 12, 2022

Related U.S. Application Data

(63) Continuation of application No. PCT/JP2020/021176, filed on May 28, 2020.

(30) Foreign Application Priority Data

Aug. 1, 2019 (JP) .................................. 2019-142188

(51) Int. Cl.
*G01N 21/31* (2006.01)
*G01N 33/28* (2006.01)
(52) U.S. Cl.
CPC ......... *G01N 21/31* (2013.01); *G01N 33/2888* (2013.01)
(58) Field of Classification Search
CPC . G01N 21/5907; G01N 21/25; G01N 33/2888
See application file for complete search history.

(56) References Cited

U.S. PATENT DOCUMENTS

| 5,194,910 A | 3/1993 | Kirkpatrick, Jr. et al. |
| 9,329,119 B2 * | 5/2016 | Shirata .................. G01N 21/25 |

(Continued)

FOREIGN PATENT DOCUMENTS

| CN | 203048722 U * | 7/2013 | |
| DE | 112008000963 T5 * | 3/2010 | ............. G01F 23/22 |

(Continued)

OTHER PUBLICATIONS

BikeAholics, "Why oil temp is important", https://www.youtube.com/watch?v=EIYJYoFCRro, Jun. 21, 2016 (Year: 2016).*

(Continued)

*Primary Examiner* — Maurice C Smith
(74) *Attorney, Agent, or Firm* — GLOBAL IP COUNSELORS, LLP

(57) ABSTRACT

A liquid deterioration determination device includes a light receiver and a determination unit. The light receiver receives detection light transmitted through a liquid or detection light reflected by the liquid. The determination unit determines a degree of deterioration of the liquid. The light receiver outputs first and second detection values. The first detection value represents an amount of a light component of a first color included in the detection light transmitted through the liquid or the detection light reflected by the liquid. The second detection value represents an amount of a light component of a second color included in the detection light transmitted through the liquid or the detection light reflected by the liquid. The second color is different from the first color. The determination unit determines the degree of deterioration of the liquid based on a ratio of the second detection value to the first detection value.

6 Claims, 12 Drawing Sheets

(56) References Cited

U.S. PATENT DOCUMENTS

| | | | |
|---|---|---|---|
| 2008/0024761 | A1 | 1/2008 | Kong et al. |
| 2009/0216464 | A1 | 8/2009 | Kong et al. |
| 2014/0146307 | A1 | 5/2014 | Arrondo et al. |
| 2016/0252490 | A1 | 9/2016 | Shirota et al. |

FOREIGN PATENT DOCUMENTS

| | | |
|---|---|---|
| JP | 2001-287100 A | 10/2001 |
| JP | 2013-536939 A | 9/2013 |
| JP | 2016-8887 A | 1/2016 |
| JP | 2017-26495 A | 2/2017 |
| JP | 2018-48842 A | 3/2018 |
| RU | 2329502 C1 | 7/2008 |
| WO | 2015/060457 A1 | 4/2015 |

OTHER PUBLICATIONS

International Search Report of corresponding PCT Application No. PCT/JP2020/021176 dated Aug. 25, 2020.

International Preliminary Report of corresponding PCT Application No. PCT/JP2020/021176 dated Feb. 10, 2022.

European Search Report of corresponding EP Application No. 20 84 7584,8 dated Jul. 15, 2022.

L.V. Markova, "Intelligent Method for Monitoring the State of Lubricating Oil". ISSN 1068-3666, Journal of Friction and Wear, 2016, vol. 37, No. 4, pp. 308-314.

LI; "Analysis of Key Points in the Management of Marine Engineering for Polar Navigation Vessels"; China Academic Journal Electronic Publishing House; China 2017, Issue No. 268, vol. 40, Issue 10, pp. 41-46.

Wang; "Anti-condensation Measures for the External Circulating Bearing Oil System of Bulb Tubular Units"; China Academic Journal Electronic Publishing House; China 1994, Issue No. 5, pp. 49-51.

Wu; "Analysis of the Operation of Jiangxia Tidal Experimental Power Station Over 15 Years"; China Academic Journal Electronic Publishing House; China 2005, pp. 22-26.

* cited by examiner

LIQUID DETERIORATION DETERMINATION DEVICE AND HYDRAULIC UNIT

CROSS-REFERENCE TO RELATED APPLICATIONS

This is a continuation of International Application No. PCT/JP2020/021176 filed on May 28, 2020, which claims priority to Japanese Patent Application No. 2019-142188, filed on Aug. 1, 2019. The entire disclosures of these applications are incorporated by reference herein.

BACKGROUND

Field of Invention

The present disclosure relates to liquid deterioration determination devices and hydraulic units.

Background Information

A conventional liquid deterioration determination device includes a light emitting element that emits detection light to lubricant, and a light receiving element that acquires a detection value representing color information of the detection light transmitted through the lubricant (see WO 2015/060457 A). This liquid deterioration determination device includes a determination unit that calculates brightness or a color component maximum difference from the detection value and determines deterioration of lubricant from a temporal change of the brightness or the color component maximum difference.

SUMMARY

A liquid deterioration determination device according to an aspect of the present disclosure includes a light receiver and a determination unit. The light receiver is configured to receive detection light transmitted through a liquid or detection light reflected by the liquid. The determination unit is configured to determine a degree of deterioration of the liquid. The light receiver is configured to output a first detection value and a second detection value. The first detection value represents an amount of a light component of a first color included in the detection light transmitted through the liquid or the detection light reflected by the liquid. The second detection value represents an amount of a light component of a second color included in the detection light transmitted through the liquid or the detection light reflected by the liquid. The second color is different from the first color. The determination unit is configured to determine the degree of deterioration of the liquid based on a ratio of the second detection value to the first detection value.

DETAILED DESCRIPTION OF EMBODIMENT(S)

Hereinafter, liquid sensors and hydraulic units according to embodiments of the present disclosure will be described with reference to the accompanying drawings.

First Embodiment

Figure 1:
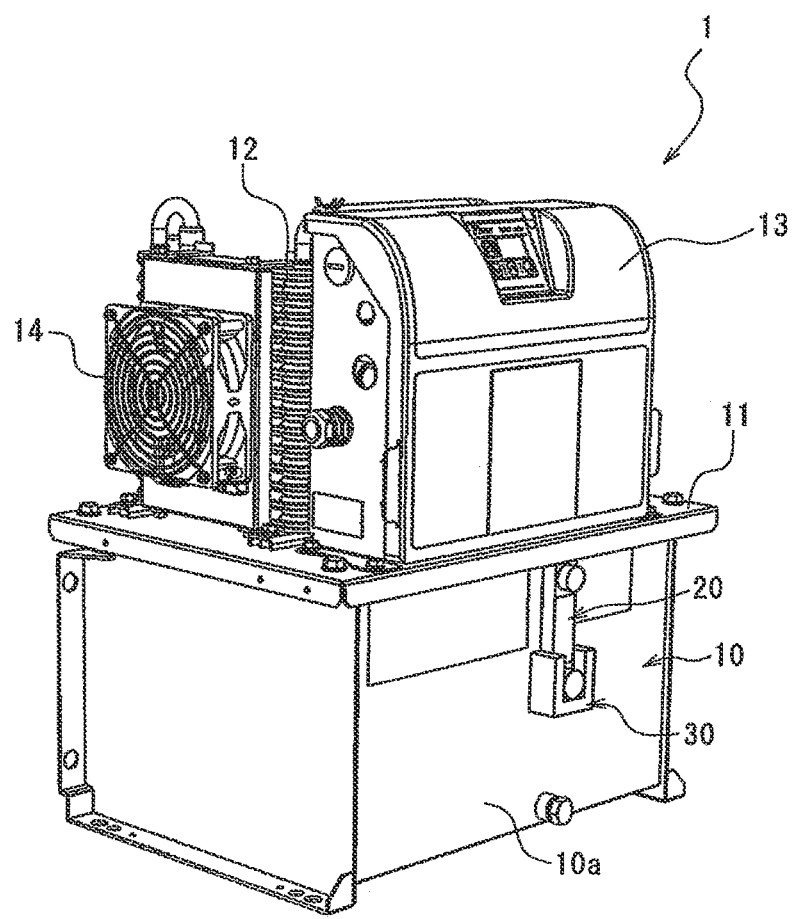
FIG. 1 is a perspective view of a hydraulic unit according to a first embodiment of the present disclosure.

FIG. 1 is a perspective view of a hydraulic unit 1 according to a first embodiment of the present disclosure. The hydraulic unit 1 according to the present embodiment supplies hydraulic oil to an external apparatus such as a machining tool.

Referring to FIG. 1, the hydraulic unit 1 includes a hydraulic oil tank 10 that accommodates hydraulic oil, and a mount 11 attached to an upper part of the hydraulic oil tank 10. The hydraulic unit 1 includes a hydraulic pump (not shown), a motor (not shown) that drives the hydraulic pump, an oil cooler 12 that cools hydraulic oil discharged from the hydraulic pump, and a controller 13 that controls the motor. The hydraulic pump, the motor, the oil cooler 12, and the controller 13 are mounted on the mount 11, and the hydraulic oil tank 10 is disposed below the mount 11. In addition, the hydraulic unit 1 includes a cooling fan 14 that supplies cooling air to the motor and the oil cooler 12. The hydraulic unit 1 is herein described by way of example only; and not limited to the above-described structure.

A liquid level gauge 20 for externally checking the amount of hydraulic oil accommodated in the hydraulic oil tank 10 is attached to a metal side surface 10a of the hydraulic oil tank 10. Since the liquid level gauge 20 is attached to the side surface 10a of the hydraulic oil tank 10, a user can easily visually check the amount of hydraulic oil accommodated in the hydraulic oil tank 10. In addition, a liquid sensor 30 that determines the degree of deterioration of liquid (hydraulic oil in the present embodiment) is attached to an outside of the liquid level gauge 20. The liquid sensor 30 according to the present embodiment is an example of a liquid deterioration determination device according to the present disclosure.

Figure 2:
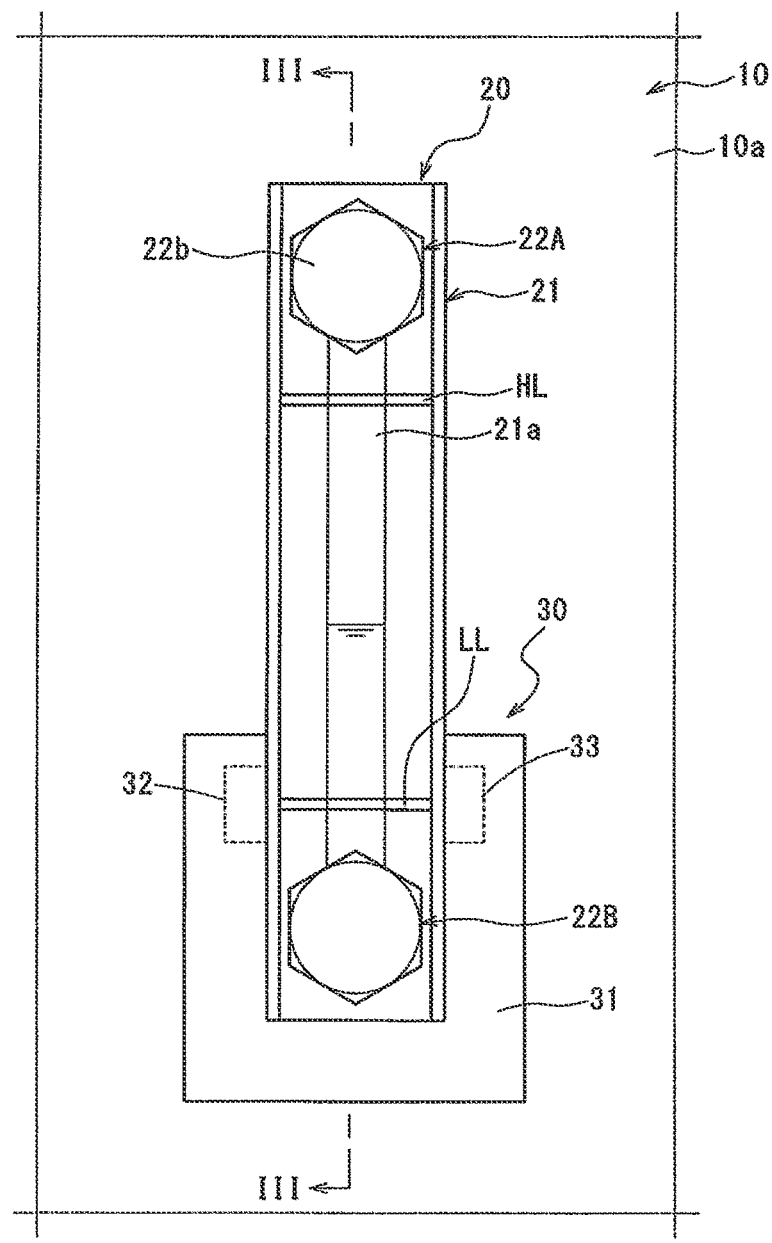
FIG. 2 is a front view of a liquid sensor according to the first embodiment.
Figure 3:
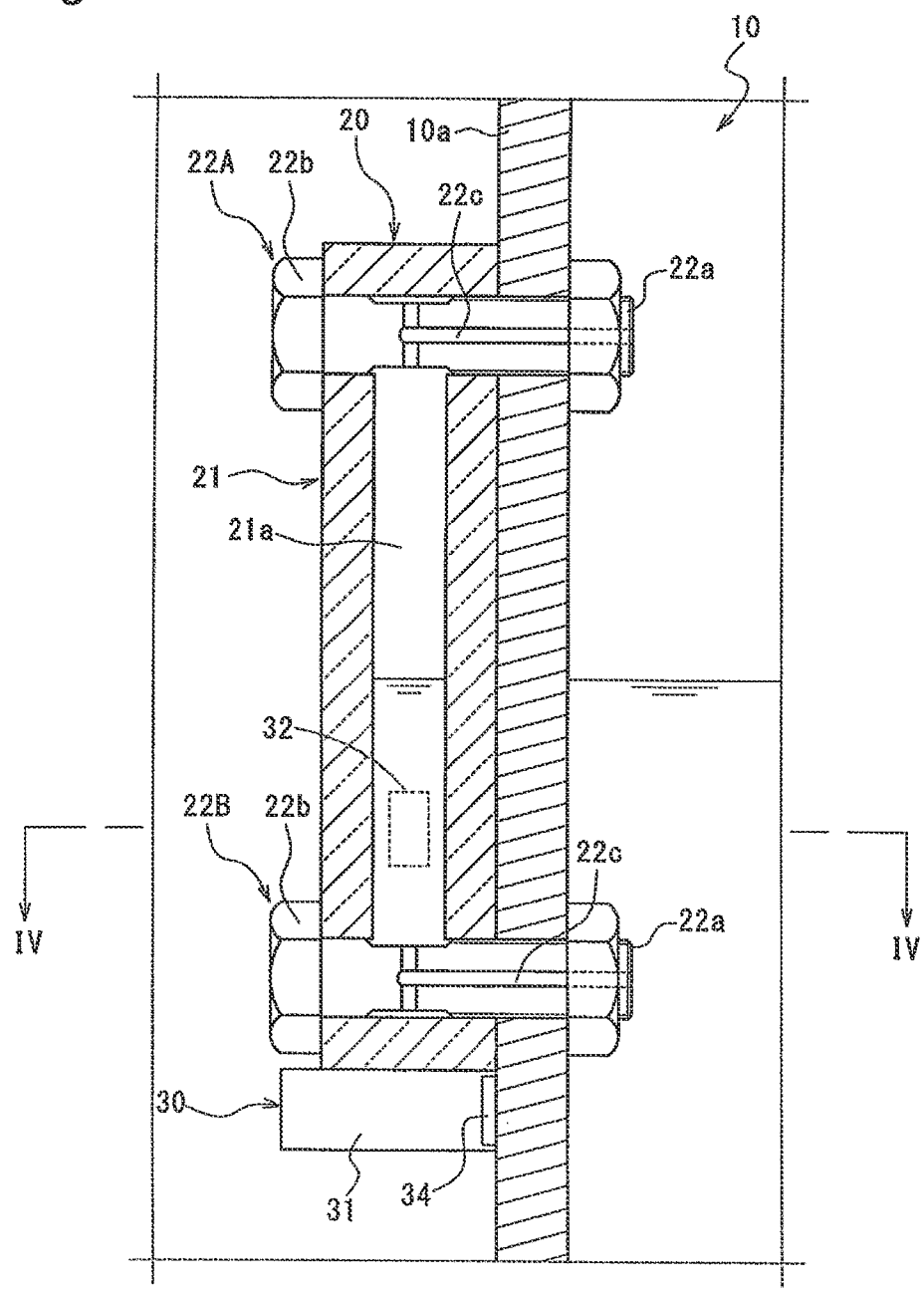
FIG. 3 is a cross-sectional view taken along a line III-III in FIG. 2.

FIG. 2 is a schematic front view showing the liquid level gauge 20 and the liquid sensor 30 according to the present embodiment. FIG. 3 is a schematic cross-sectional view taken along a line III-III in FIG. 2, in FIG. 3, illustration of a detailed structure of the inside of the liquid sensor 30 is omitted. In FIGS. 2 and 3, the same constituent elements as in FIG. 1 are denoted by the same reference signs as in FIG. 1.

Referring to FIGS. 2 and 3, the liquid level gauge 20 of the present embodiment is an oil level gauge for checking the oil level of the hydraulic oil accommodated in the hydraulic oil tank 10. The liquid level gauge 20 of the present embodiment includes a liquid level gauge main body 21 made of a transparent acrylic resin and two bolts 22A and 22B for fixing the liquid level gauge main body 21 to the hydraulic oil tank 10. The liquid level gauge 20 according to the present embodiment is an example of a translucent tubular member into which the liquid (hydraulic oil in the present embodiment) according to the present disclosure is introduced.

The liquid level gauge main body 21 of the present embodiment has a substantially rectangular parallelepiped shape, and is attached to the hydraulic oil tank 10 such that the liquid level gauge main body 21 has a longitudinal direction that extends along the vertical direction. The liquid level gauge main body 21 is hollow. Specifically, the liquid level gauge main body 21 includes a hollow portion 21a being a space extending in the longitudinal direction inside the liquid level gauge main body 21. The hydraulic oil is introduced into the hollow portion 21a of the liquid level gauge main body 21 according to the amount of hydraulic oil stored in the hydraulic oil tank 10. The user can check the amount of hydraulic oil accommodated in the hydraulic oil tank 10 by visually observing the oil level of the hydraulic oil in the hollow portion 21a of the liquid level gauge main body 21. The liquid level gauge main body 21 is provided with an upper limit line HL indicating the upper limit of an allowable range of the oil level of the hydraulic oil and a lower limit line LL indicating the lower limit of the allowable range of the oil level of the hydraulic oil.

The bolts 22A and 22B of the present embodiment are made of metal. As shown in FIG. 3, each of the bolts 22A and 22B includes a communication portion 22c extending in the axial direction from a tip portion 22a toward a head portion 22b of the bolt. The communication portion 22c is open in the radial direction at an axial end portions on the head portion 22b side of each of the bolts 22A and 22B. In other words, the bolts 22A and 22B are what are called perforated bolts. The communication portions 22c of the bolts 22A and 22B fluidly connect the internal space of the hydraulic oil tank 10 to the hollow portion 21a of the liquid level gauge main body 21 in a state where the bolts 22A and 22B fix the liquid level gauge main body 21 to the hydraulic oil tank 10. In other words, the internal space of the hydraulic oil tank 10, the hollow portion 21a of the liquid level gauge main body 21, and the communication portions 22c of the bolts 22A and 22B communicate with each other.

In the state shown in FIG. 3, the communication portion 22c of the bolt 22B opens at the tip portion 22a into an area where the hydraulic oil accumulated in the hydraulic oil tank 10 exits. At this time, the hydraulic oil is introduced from the hydraulic oil tank 10 into the hollow portion 21a of the liquid level gauge main body 21 through the communication portion 22c of the bolt 22B. In addition, the communication portion 22c of the bolt 22B is filled with the hydraulic oil.

As shown in FIG. 3, the oil level of the hydraulic oil introduced into the liquid level gauge main body 21 coincides with the oil level of the hydraulic oil accommodated in the hydraulic oil tank 10. Thus, the user can check the amount of hydraulic oil accommodated in the hydraulic oil tank 10 by visually observing the oil level of the hydraulic oil introduced into the hollow portion 212 of the liquid level gauge main body 21.

The liquid sensor 30 of the present embodiment is a sensor for detecting the degree of deterioration of the hydraulic oil accommodated in the hydraulic oil tank 10. More specifically, the liquid sensor 30 is a transmissive color sensor. As shown in FIG. 2, the liquid sensor 30 of the present embodiment includes a U-shaped casing 31, a light emitter 32 that emits detection light, and a light receiver 33 that receives the detection light emitted from the light emitter 32. The light emitter 32 and the light receiver 33 are provided integrally with the casing 31 so as to face each other. Specifically, the light emitter 32 and the light receiver 33 are provided integrally with the casing 31 in a manner that the optical axis of the light emitter 32 and the optical axis of the light receiver 33 coincide with each other.

The liquid sensor 30 is attached to the liquid level gauge main body 21 such that the light emitter 32 and the light receiver 33 face each other across the liquid level gauge main body 21. In addition, the liquid sensor 30 is attached to the liquid level gauge 20 such that height positions of the light emitter 32 and the light receiver 33 overlap with a height position of the lower limit line LL of the liquid level gauge main body 21.

A packing (not shown j is provided between the casing 31 of the liquid sensor 30 and the liquid level gauge main body 21 of the present embodiment. This packing makes the casing 31 and the liquid level gauge main body 21 water-resistant and dust-resistant, prevents external light from entering the liquid level gauge main body 21, and brings the casing into close contact with the liquid gauge main body 21 so that the casing 31 is held by the liquid level gauge main body 21.

The light emitter 32 of the present embodiment includes a light emitting element for emitting detection light and a drive circuit for driving the light emitting element. The light emitting element of the present embodiment is a white light emitting diode. In other words, the light emitter 32 of the present embodiment emits white detection light.

The light receiver 33 of the present embodiment includes a light receiving element that converts the amount of light into an electric signal, an amplifier circuit that amplifies the electric signal output from the light receiving element, and an A/D conversion circuit that converts the analog electric signal amplified by the amplifier circuit into a digital electric signal. The light receiving element of the present embodiment is an RGB color sensor, and can detect the electric signal converted from received visible light separately for each of red, green, and blue. The red in the present embodiment is an example of a first color according to the present disclosure. The blue in the present embodiment is an example of a second color according to the present disclosure. The green in the present embodiment is an example of a third color according to the present disclosure.

The light receiver 33 outputs a detection value representing the amount of a light component having a wavelength of each of red, green, and blue, for light having wavelengths not absorbed by the hydraulic oil in the liquid level gauge 20 among the detection light emitted from the light emitter 32. In other words, the light receiver 33 outputs a red detection value R, a green detection value G, and a blue detection value B representing the amounts of light components having different wavelengths from each other and included in the detection light transmitted through the hydraulic oil in the liquid level gauge 20. Specifically, the red detection value R in the present embodiment represents the amount of light of a red wavelength included in the detection light transmitted through the hydraulic oil in the liquid level gauge 20. The green detection value G in the present embodiment represents the amount of light of a green wavelength included in the detection light transmitted through the hydraulic oil in the liquid level gauge 20. Further, the blue detection value B in the present embodiment represents the amount of light of a blue wavelength included in the detection light transmitted through the hydraulic oil in the liquid level gauge 20.

The detection value indicating the amount of light is output as, for example, an output voltage or an output current from the light receiver 33. Specifically, the red detection value R of the present embodiment is output as an output voltage or an output current from the light receiver 33 for the red included in the detection light transmitted through the hydraulic oil in the liquid level gauge 20. The green detection value G of the present embodiment is output as an output voltage or an output current from the light receiver 33 for the blue included in the detection light transmitted through the hydraulic oil in the liquid level gauge 20. The blue detection value B of the present embodiment is output as an output voltage or an output current from the light receiver 33 for the green included in the detection light transmitted through the hydraulic oil in the liquid level gauge 20.

As shown in FIG. 3, the liquid sensor 30 of the present embodiment further includes a thermoelectric conversion element 34 that converts heat into electric power. The thermoelectric conversion element 34 of the present embodiment is provided so as to be in contact with the side surface 10a of the hydraulic oil tank 10. The side surface 10a of the hydraulic oil tank 10 is likely to have a high temperature because the hydraulic oil accommodated in the hydraulic oil tank 10 has a high temperature due to heat generation from a sliding portion of the machining tool or the like. The thermoelectric conversion element 34 generates power using a temperature difference between the temperature of the side surface 10a of the hydraulic oil tank 10 and the temperature of the air around the liquid sensor 30.

Figure 4:
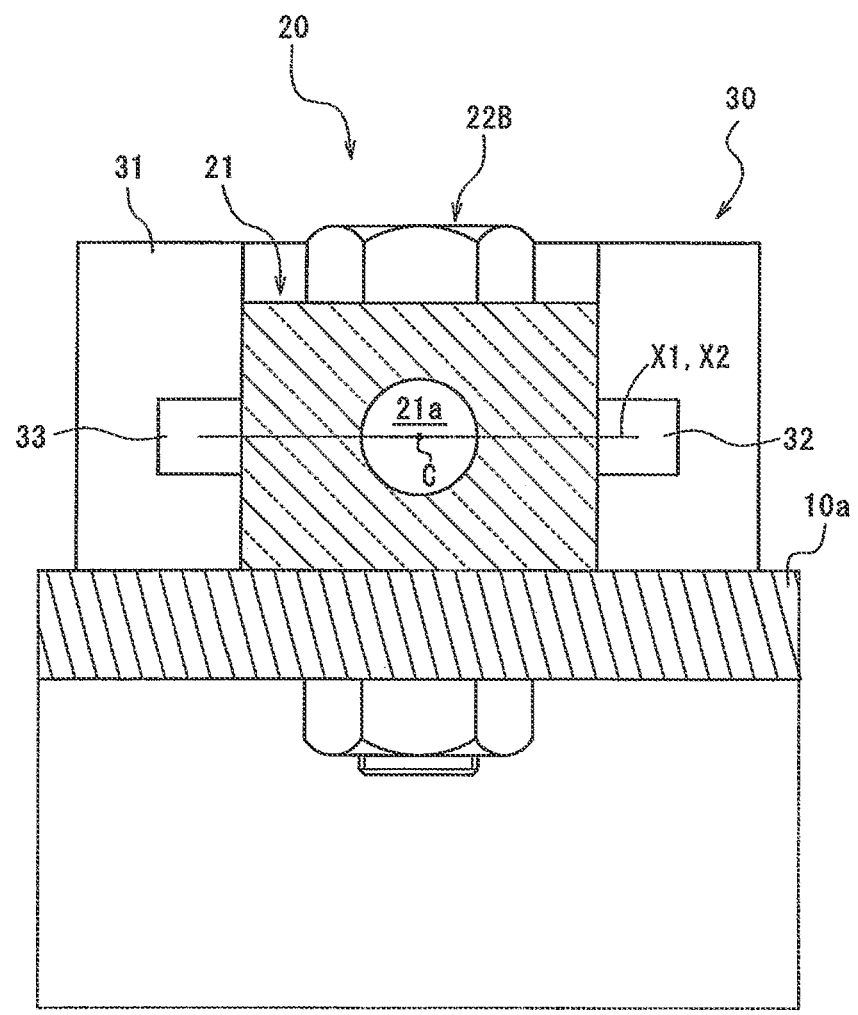
FIG. 4 is a cross-sectional view taken along a line IV-IV in FIG. 3.

FIG. 4 is a schematic cross-sectional view taken along a line IV-IV in FIG. 3. In FIG. 4, illustration of a detailed structure of the inside of the liquid sensor 30 is omitted. In FIG. 4, the same components as in FIGS. 1 to 3 are denoted by the same reference signs as in FIGS. 1 to 3.

Referring to FIG. 4, the hollow portion 21a of the liquid level gauge main body 21 has a circular cross-sectional shape in the cross section shown in FIG. 4.

Figure 5:
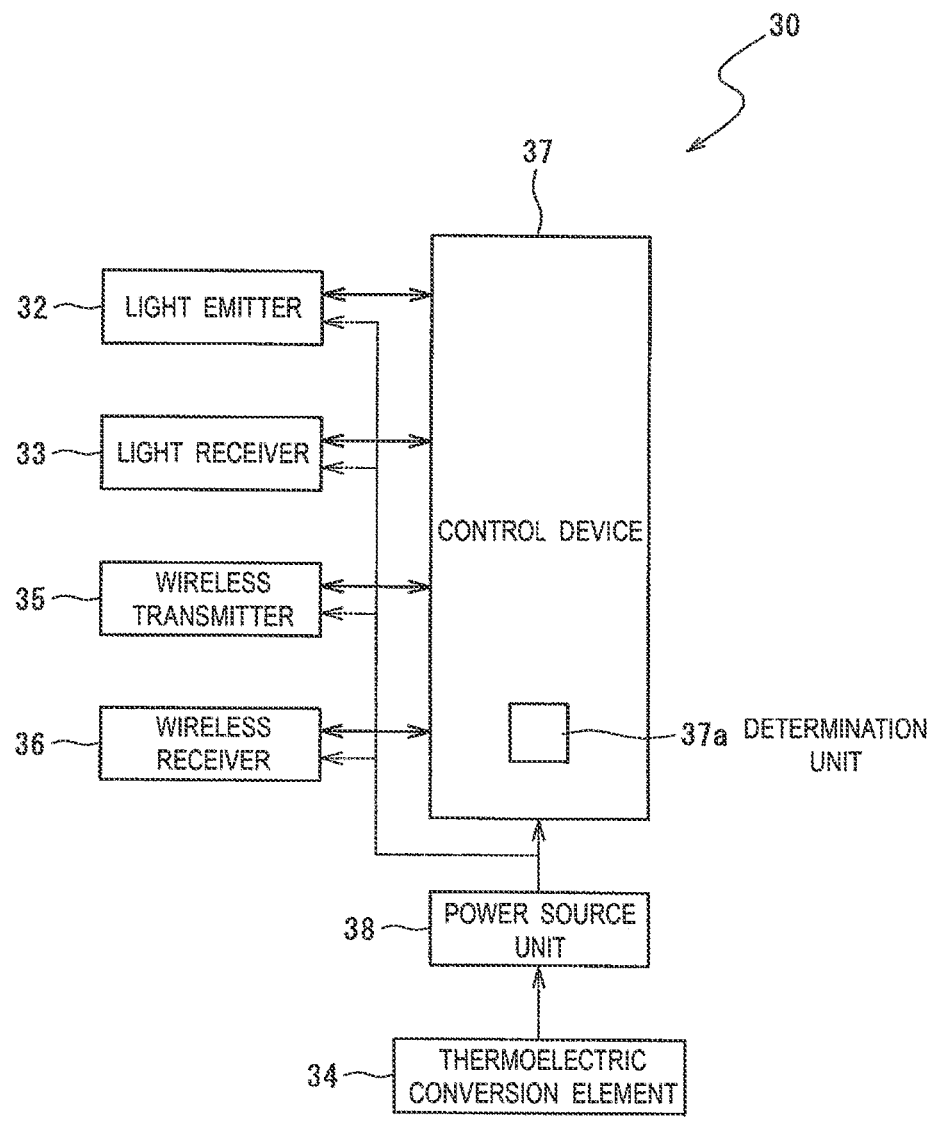
FIG. 5 is a block diagram of the liquid sensor according to the first embodiment.

As shown in FIG. 4, an optical axis X1 of the light emitter 32 and an optical axis X2 of the light receiver 33 coincide with each other. In addition, the optical axis X1 of the light emitter 32 and the optical axis X2 of the light receiver 33 extend to pass through the center C of the hollow portion 21a of the liquid level gauge main body 21. Here, the optical axis X1 of the light emitter 32 and the optical axis X2 of the light receiver 33 do not necessarily need to pass through the center C of the hollow portion 21a. It is preferable that the shortest distance from the optical axis X1 of the light emitter 32 and the optical axis X2 of the light receiver 33 to the center C of the hollow portion 21a is 5 mm or less, FIG. 5 is a block diagram of the liquid sensor 30 of the present embodiment. In FIG. 5, the same components as in FIGS. 1 to 3 are denoted by the same reference signs as in FIGS. 1 to 3.

Referring to FIG. 5, the liquid sensor 30 of the present embodiment includes a wireless transmitter 35 that wirelessly transmits a signal to the external apparatus, a wireless receiver 36 that wirelessly receives a signal from the external apparatus, and a control device 37.

The wireless transmitter 35 can communicate with the controller 13 (shown in FIG. 1) of the hydraulic unit 1, and transmits an electric signal output from the light receiver 33 to the controller 13 of the hydraulic unit 1. The wireless receiver 36 can communicate with the controller 13 of the hydraulic unit 1, and receives an electric signal such as a control signal from the controller 13 of the hydraulic unit 1.

The control device 37 controls the light emitter 32, the light receiver 33, the wireless transmitter 35, and the wireless receiver 36. The control device 37 of the present embodiment includes a determination unit 37a that determines the degree of deterioration of the liquid (hydraulic oil in the present embodiment) using the detection values output from the light receiver 33. Specifically, the determination unit 37a determines the degree of deterioration of the hydraulic oil using the red detection value R, the green detection value G, and the blue detection value B output from the light receiver 33.

The liquid sensor 30 further includes a power source unit 38 for supplying power (see a two-dot chain line in FIG. 5) to each of the light emitter 32, the light receiver 33, the wireless transmitter 35, the wireless receiver 36, and the control device 37. The power source unit 38 of the present embodiment includes a rechargeable battery. In addition, the power source unit 38 is electrically connected to the thermoelectric conversion element 34. The thermoelectric conversion element 34 generates electric power for charging the power source unit 38 using a temperature difference between the hydraulic oil tank 10 (shown in FIG. 1) and the air around the liquid sensor 30.

Determination of Degree of Deterioration of Liquid

The light emitter 32 of the liquid sensor 30 according to the present embodiment emits white light from the light emitting element using the power supplied from the power source unit 38. The light receiver 33 of the liquid sensor 30 receives detection light emitted from the light emitter 32 and having passed through the liquid level gauge main body 21 having translucency and the hydraulic oil in the liquid level gauge main body 21. The light receiver 33 outputs, to the determination unit 37a of the control device 37, the red detection value R, the green detection value G, and the blue detection value B respectively representing the amounts of light components having wavelengths of red, green, and blue included in the detection light received by the light receiving element of the light receiver 33.

Figure 6:
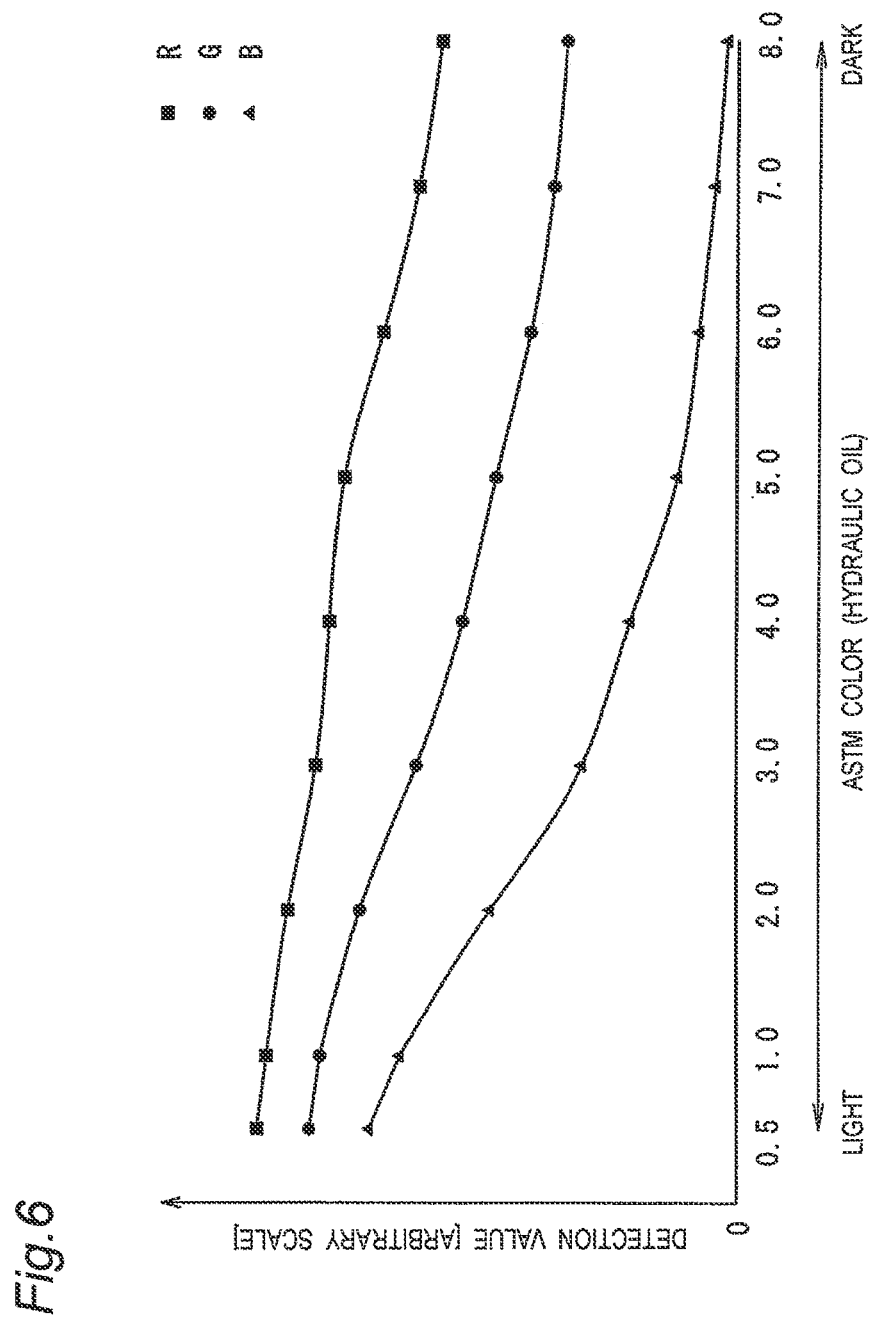
FIG. 6 is a diagram showing a relationship between a detection value detected by the liquid sensor according to the first embodiment and the ASTM color of hydraulic oil.

FIG. 6 is a diagram showing a relationship between the ASTM color of the hydraulic oil and the red detection value R, the green detection value G, and the blue detection value B in the present embodiment. In other words, FIG. 6 shows the red detection value R, the green detection value G, and the blue detection value B for the detection light that has transmitted through the hydraulic oil of each ASTM color. The vertical axis in FIG. 6 indicates a detection value [arbitrary scale] representing the amount of light output from the light receiver 33. The horizontal axis in FIG. 6 indicates the ASTM color indicating the hue of the hydraulic oil. The ASTM color is measured in accordance with ASTM D 1500. In the ASTM color, the hue of the hydraulic oil is numerically expressed from 0.5 of a light color to 8.0 of a dark color in increments of 0.5. The ASTM color is an index of the degree of deterioration of the hydraulic oil, and indicates that the greater the value of the ASTM color, the more the hydraulic oil is deteriorated.

Referring to FIG. 6, as the value of the ASTM color increases, the amount of the detection light received by the light receiver 33 decreases, and thus, the detection value representing the amount of light also decreases monotonically. In other words, as the degree of deterioration of the hydraulic oil progresses, the red detection value R, the green detection value G, and the blue detection value B decrease monotonically. Further, the amount of change in the red detection value R accompanying the change in the ASTM color is smaller than the amounts of change in the green detection value G and the blue detection value B accompanying the change in the ASTM color. In addition, the amount of change in the green detection value G accompanying the change in the ASTM color is larger than the amount of change in the red detection value R accompanying the change in the ASTM color, and is smaller than the amount of change in the blue detection value B accompanying the change in the ASTM color. The amount of change in the blue detection value B accompanying the change in the ASTM color is larger than the amounts of change in the red detection value R and the green detection value G accompanying the change in the ASTM color.

In the present embodiment, the determination unit 37a determines the degree of deterioration of the hydraulic oil from a ratio B/R of the blue detection value B to the red detection value R and a ratio G/R, of the green detection value G to the red detection value R. The red detection value R of the present embodiment is an example of a first detection value according to the present disclosure. The blue detection value B of the present embodiment is an example of a second detection value according to the present disclosure. The green detection value G of the present embodiment is an example of a third detection value according to the present disclosure.

Figure 7:
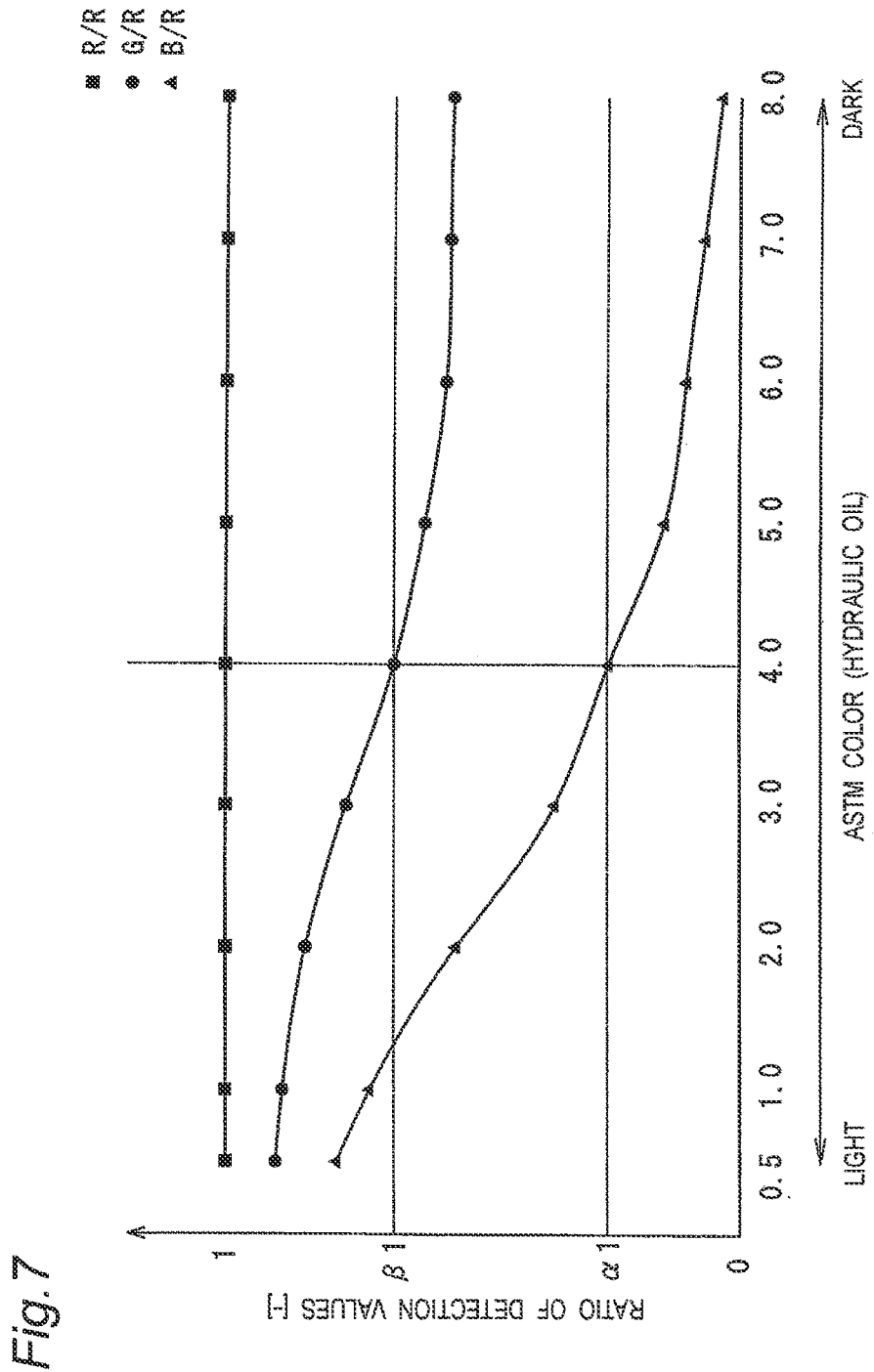
FIG. 7 is a diagram showing a relationship between a ratio of the detection value detected by the liquid sensor according to the first embodiment and the ASTM color of hydraulic oil.

FIG. 7 is a diagram showing a relationship between the ratios of the red detection value R, the green detection value G, and the blue detection value B to the red detection value R and the ASTM color of the hydraulic oil. The vertical axis in FIG. 7 indicates the ratio of each detection value to the red detection value R. The horizontal axis in FIG. 7 indicates the ASTM color indicating the hue of the hydraulic oil. In FIG. 7, a ratio R/R of the red detection value R to the red detection value R is indicated by a square mark. The ratio G/R of the green detection value G to the red detection value R is indicated by a circle mark. The ratio B/R of the blue detection value B to the red detection value R is indicated by a triangle mark.

Referring to FIG. 7, the ratio G/R of the green detection value G to the red detection value R decreases generally monotonically as the value of the ASTM color increases. In other words, the ratio G/R of the green detection value G to the red detection value R decreases generally monotonically as the degree of deterioration of the hydraulic oil progresses. Similarly, the ratio B/R of the blue detection value B to the red detection value R decreases monotonically as the value of the ASTM color increases. In other words, the ratio B/R of the blue detection value B to the red detection value R decreases monotonically as the degree of deterioration of the hydraulic oil progresses. The amount of change in the ratio B/R of the blue detection value B to the red detection value R accompanying the change in the ASTM color is larger than the amount of change in the ratio G/R of the green detection value G to the red detection value R accompanying the change in the ASTM color.

The determination unit 37a determines the degree of deterioration of the hydraulic oil based on the correspondence relationship shown in FIG. 7 between the ASTM color of the hydraulic oil (corresponding to the degree of deterioration of the hydraulic oil) and the ratio B/R of the blue detection value B to the red detection value R. Specifically, first, the determination unit 37a of the present embodiment calculates the ratio B/R of the blue detection value B to the red detection value R from the red detection value R and the blue detection value B output from the light receiver 33. Next, based on the correspondence relationship between the degree of deterioration of the hydraulic oil and the ratio B/R, the determination unit 37a determines the degree of deterioration of the hydraulic oil from the ratio B/R calculated from the detection values.

In addition to determine the degree of deterioration of the hydraulic oil based on the ratio B/R of the blue detection value B to the red detection value R, the determination unit 37a of the present embodiment also determines the degree of deterioration of the hydraulic oil based on the ratio G/R of the green detection value G to the red detection value R. The determination unit 37a determines the degree of deterioration of the hydraulic oil based on the correspondence relationship shown in FIG. 7 between the degree of deterioration of the hydraulic oil and the ratio G/R of the green detection value G to the red detection value R. Specifically, first, the determination unit 37a of the present embodiment calculates the ratio G/R of the green detection value G to the red detection value R from the red detection value R and the green detection value G output from the light receiver 33. Next, based on the correspondence relationship between the degree of deterioration of the hydraulic oil and the ratio G/R, the determination unit 37a determines the degree of deterioration of the hydraulic oil from the ratio G/R calculated from the detection value.

When the determination unit 37a determines that the degree of deterioration of the hydraulic oil is more than a predetermined degree of deterioration (for example, the degree of deterioration corresponding to the value of ASTM of 4.0) and that the hydraulic oil is deteriorated, the control device 37 controls the light emitter 32 to emit light to notify the user of the deterioration. The determination unit 37a determines that the hydraulic oil is deteriorated when the calculated ratio B/R of the blue detection value B to the red detection value R is smaller than a predetermined threshold $\alpha 1$ (for example, the ratio B/R corresponding to the value of ASTM color of 4.0, see a two-dot chain line in the drawing). Alternatively, for example, the determination unit 37a determines that the hydraulic oil is deteriorated when the calculated ratio G/R of the green detection value G to the red detection value R is smaller than a predetermined threshold $\beta 1$ (for example, the ratio G/R corresponding to the value of ASTM color of 4.0, see a two-dot chain line in the drawing). In other words, the determination unit 37a of the present embodiment determines that the hydraulic oil is deteriorated when the calculated ratio B/R of the blue detection value B to the red detection value R is smaller than the predetermined threshold $\alpha 1$, or when the calculated ratio G/R of the green detection value G to the red detection value R is smaller than the predetermined threshold $\beta 1$.

The controller 13 (shown in FIG. 1) of the hydraulic unit 1 may display a numerical value (for example, the ASTM color value) or color on a display unit 13a provided in the controller 13, a display unit (not shown) provided in the external apparatus to which the hydraulic unit 1 supplies the hydraulic oil, or others in accordance with the level of the degree of deterioration of the hydraulic oil. Thus, it is possible to alert the user to replace the hydraulic oil before the hydraulic oil needs to be replaced.

In addition, the controller 13 (shown in FIG. 1) of the hydraulic unit 1 may notify the user of the deterioration of the hydraulic oil before the hydraulic oil needs to be replaced. For example, the controller 13 of the hydraulic unit 1 may notify the user of the deterioration of the hydraulic oil by causing the light emitter 32 to emit light even before the ASTM color becomes dark to 4.0 or more, for example. In this case, as the deterioration of the hydraulic oil progresses, the frequency of light emission of the light emitter 32 may increase.

When the temperature in a factory where the hydraulic unit 1 is installed is low, dew condensation occurs on the inner surface of the liquid level gauge main body 21 that defines the hollow portion 21a, and the liquid sensor 30 may make an erroneous determination due to irregular reflection caused by the dew condensation or moisture mixing into the hydraulic oil. Therefore, the measurement using the liquid sensor 30 described above is preferably performed after it is determined that the hydraulic unit 1 is in a stable operation state by referring to the operation time or the oil temperature rise after the start of the hydraulic unit 1.

Comparative Example

Figure 8:
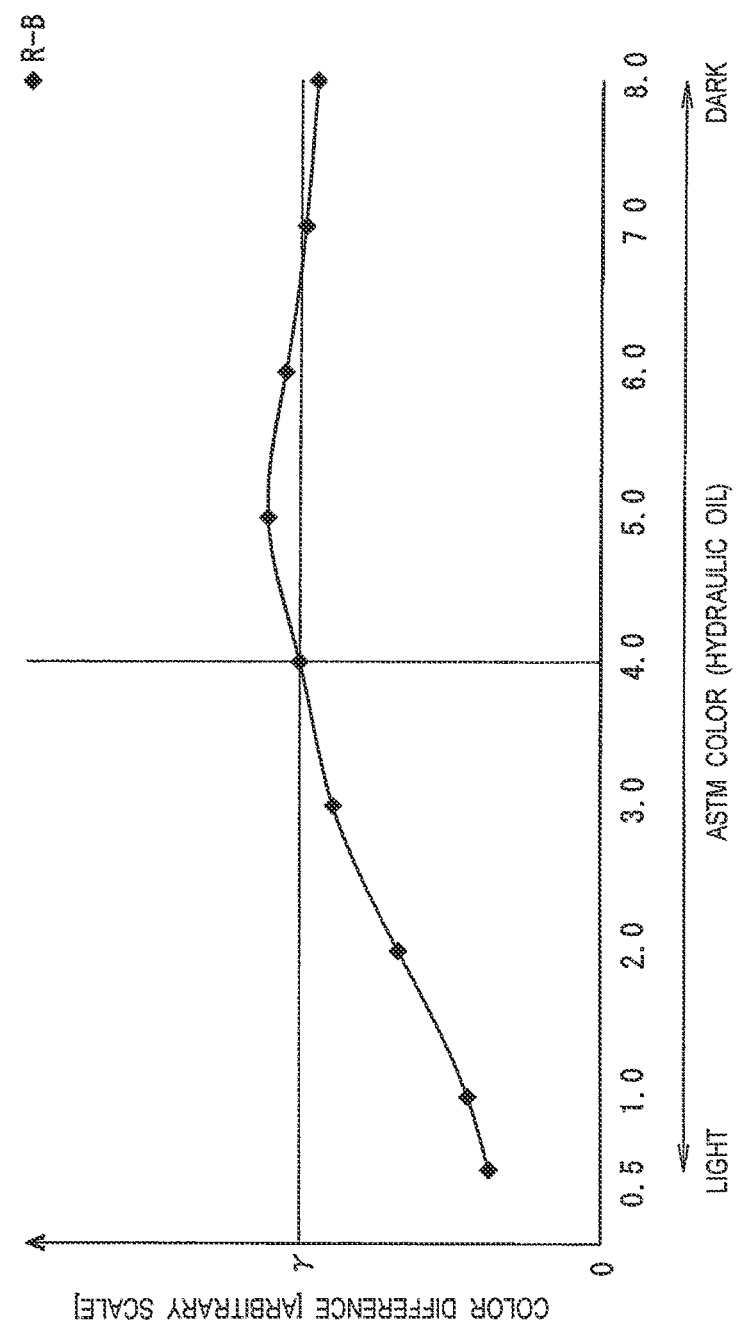
FIG. 8 is a diagram showing a relationship between a color difference and the ASTM color according to a comparative example of the first embodiment.

FIG. 8 is a diagram showing a relationship between a color difference and the ASTM color according to a comparative example of the present embodiment. The vertical axis in FIG. 8 indicates the color difference [arbitrary scale]. The horizontal axis in 8 indicates the ASTM color. In the present comparative example, the color difference is obtained from the difference between the red detection value R and the blue detection value B. As shown in FIG. 8, the color difference R–B increases as the value of the ASTM color increases, and decreases beyond the extreme value. In an attempt to determine the degree of deterioration of the hydraulic oil based on the color difference R–B, the degree of deterioration of the hydraulic oil may not be uniquely determined for one color difference R–B, and there is a risk that the determination unit 37a erroneously detects the degree of deterioration of the hydraulic oil. For example, when the determination unit 37a attempts to determine the deterioration of the hydraulic oil in the case where the color difference R–B is larger than a predetermined threshold γ (the color difference R–B corresponding to the value of ASTM color of 4.0, see a two-dot chain line in the drawing), the determination unit 37a determines that the hydraulic oil is not deteriorated because the color difference R–B is smaller than the threshold γ even when the value of the ASTM color is larger than 7.0.

The ratio B/R of the blue detection value B to the red detection value R decreases monotonically as the degree of deterioration of the hydraulic oil progresses. In other words, only one degree of deterioration of the hydraulic oil is determined for one ratio B/R of the blue detection value B to the red detection value R. Therefore, according to the present embodiment, the determination unit 37a determines the degree of deterioration of the hydraulic oil at the time when the red detection value R and the blue detection value B are detected. As a result, the determination unit 37a does not need to determine the degree of deterioration of the hydraulic oil from the temporal change of the detection value, and does not need to continuously detect the detection value, so that the degree of deterioration of the hydraulic oil can be determined with a simple configuration.

As shown in the comparative example of FIG. 8, in an attempt to determine the degree of deterioration of the hydraulic oil based on the color difference R–B between the red detection value R and the blue detection value B, there is a case where the degree of deterioration of the hydraulic oil is not uniquely determined for one color difference R–B between the red detection value R and the blue detection value B. As a result, there is a risk that the determination unit 37a erroneously determines the degree of deterioration of the hydraulic oil. On the other hand, in the present embodiment, as described above, because only one degree of deterioration of the hydraulic oil is determined with respect to one ratio B/R of the blue detection value B to the red detection value R, the determination unit 37a can be suppressed from erroneously determining the deuce of deterioration of the hydraulic oil.

Further, according to the present embodiment, the determination unit 37a of the present embodiment determines the degree of deterioration of the hydraulic oil based on the ratio B/R of the blue detection value B to the red detection value R and also on the ratio G/R of the green detection value G to the red detection value R. As a result, the determination accuracy can be improved as compared with the case where the degree of deterioration of the hydraulic oil is determined only by the ratio B/R of the blue detection value B to the red detection value R.

In the present embodiment, the determination unit 37a determines that the hydraulic oil is deteriorated when the calculated ratio B/R of the blue detection value B to the red detection value R is smaller than the predetermined threshold α1 or when the calculated ratio G/R of the green detection value G to the red detection value R is smaller than the predetermined threshold β1, but the present invention is not limited thereto. The determination unit 37a may determine that the hydraulic oil is deteriorated when the calculated ratio B/R of the blue detection value B to the red detection value R is smaller than the predetermined threshold α1 and also when the calculated ratio G/R of the green detection value G to the red detection value R is smaller than the predetermined threshold β1.

In the present embodiment, the determination unit 37a determines the degree of deterioration of the hydraulic oil based on the ratio B/R of the blue detection value B to the red detection value R and also on the ratio G/R of the green detection value G to the red detection value R, but the present invention is not limited thereto. The determination unit 37a may determine the degree of deterioration of the hydraulic oil only by the ratio B/R of the blue detection value B to the red detection value R. or may determine the degree of deterioration of the hydraulic oil only by the ratio G/R of the green detection value G to the red detection value R.

In the present embodiment, the determination unit 37a determines the degree of deterioration of the hydraulic oil based on the ratio B/R of the blue detection value B to the red detection value R, but the present invention is not limited thereto. For example, the determination unit 37a may use a ratio (B+c)/R or a ratio B/(R+c) to determine the degree of deterioration of the hydraulic oil. Here, c is any number, and may be a constant or a variable. That is, the determination unit 37a may determine the degree of deterioration of the hydraulic oil based on a ratio that includes the ratio B/R. In other words, the ratio B/R of the blue detection value B to the red detection value R used by the determination unit 37a to determine the degree of deterioration of the hydraulic oil is not strictly limited to itself, but may include at least the ratio B/R, and may be appropriately modified within this range.

Similarly, in the present embodiment, the determination unit 37a determines the degree of deterioration of the hydraulic oil based on the ratio G/R of the green detection value G to the red detection value R, but the present invention is not limited thereto. For example, the determination unit 37*a* may use a ratio (G+c)/R or a ratio G/(R+c) to determine the degree of deterioration of the hydraulic oil. Here, c is any number, and may be a constant or a variable. That is, the determination unit 37*a* may determine the degree of deterioration of the hydraulic oil based on a ratio that includes the ratio G/R. In other words, the ratio G/R of the green detection value G to the red detection value R used by the determination unit 37*a* to determine the degree of deterioration of the hydraulic oil is not strictly limited to itself, but may include at least the ratio G/R, and may be appropriately modified within this range.

Second Embodiment

A hydraulic unit 1 of a second embodiment has the same configuration as the hydraulic unit 1 of the first embodiment except for the first color, the second color, and the third color, and the first detection value, the second detection value, and the third detection value, and the description of the first embodiment referring to FIGS. 1 to 6 is applied to the second embodiment.

A determination unit 37*a* of the present embodiment determines the degree of deterioration of the hydraulic oil from a ratio B/G of the blue detection value B to the green detection value G and a ratio R/G of the red detection value R to the green detection value G. The green of the present embodiment is an example of the first color according to the present disclosure, and the green detection value G of the present embodiment is an example of the first detection value according to the present disclosure. The blue of the present embodiment is an example of the second color according to the present disclosure, and the blue detection value B in the present embodiment is an example of the second detection value according to the present disclosure. The green of the present embodiment is an example of the third color according to the present disclosure, and the green detection value G of the present embodiment is an example of the third detection value according to the present disclosure.

Figure 9:
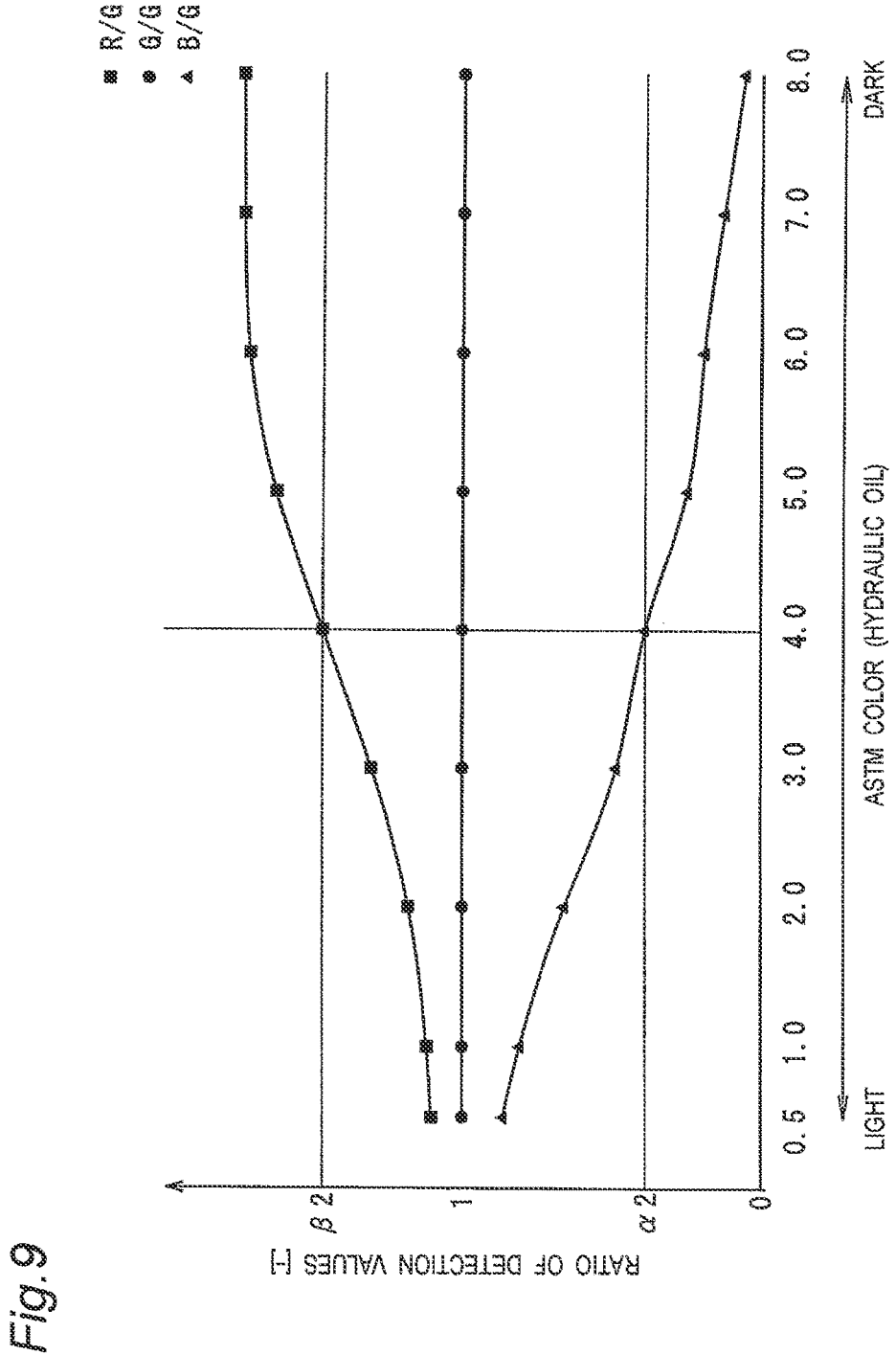
FIG. 9 is a diagram showing a relationship between a ratio of a detection value detected by a liquid sensor according to a second embodiment of the present disclosure and the ASTM color of hydraulic oil.

FIG. 9 is a diagram showing a relationship between the ratios of the red detection value R, the green detection value G, and the blue detection value B to the green detection value G and the ASTM color of the hydraulic oil. The vertical axis in FIG. 9 indicates the ratio of each detection value to the green detection value G. The horizontal axis in FIG. 9 indicates the ASTM color indicating the hue of the hydraulic oil. In FIG. 9, the ratio R/G of the red detection value R to the green detection value G is indicated by a square mark. A ratio G/G of the green detection value G to the green detection value G is indicated by a circle mark. The ratio B/G of the blue detection value B to the green detection value G is indicated by a triangle mark.

Referring to FIG. 9, the ratio R/G of the red detection value R to the green detection value G increases generally monotonically as the value of the ASTM color increases. In other words, the ratio R/G of the red detection value R to the green detection value G increases generally monotonically as the degree of deterioration of the hydraulic oil progresses. Similarly, the ratio B/G of the blue detection value B to the green detection value G decreases monotonically as the value of the ASTM color increases. In other words, the ratio B/G of the blue detection value B to the green detection value G decreases monotonically as the degree of deterioration of the hydraulic oil progresses. The amount of change in the ratio B/G of the blue detection value B to the green detection value G accompanying the change in the ASTM color is larger than the amount of change in the ratio R/G of the red detection value R to the green detection value G accompanying the change in the ASTM color.

The determination unit 37*a* determines the degree of deterioration of the hydraulic oil based on the correspondence relationship shown in FIG. 9 between the degree of deterioration of the hydraulic oil and the ratio B/G of the blue detection value B to the green detection unit G. Specifically, first, the determination unit 37*a* of the present embodiment calculates the ratio B/G of the blue detection value B to the green detection value G from the green detection value G and the blue detection value B output from a light receiver 33. Next, based on the correspondence relationship between the degree of deterioration of the hydraulic oil and the ratio B/G, the determination unit 37*a* determines the degree of deterioration of the hydraulic oil from the ratio B/G calculated from the detection values.

In addition to determine the degree of deterioration of the hydraulic oil based on the ratio B/G of the blue detection value B to the green detection value G, the determination unit 37*a* of the present embodiment determines the degree of deterioration of the hydraulic oil based on the ratio R/G of the red detection value R to the green detection value G. The determination unit 37*a* determines the degree of deterioration of the hydraulic oil based on the correspondence relationship shown in FIG. 9 between the degree of deterioration of the hydraulic oil and the ratio R/G of the red detection value R to the green detection value G. Specifically, first, the determination unit 37*a* of the present embodiment calculates the ratio R/G of the red detection value R to the green detection value G from the green detection value G and the red detection value R output from the light receiver 33. Next, based on the correspondence relationship between the degree of deterioration of the hydraulic oil and the ratio R/G, the determination unit 37*a* determines the degree of deterioration of the hydraulic oil from the calculated ratio R/G.

When the determination unit 37*a* determines the degree of deterioration of the hydraulic oil is more than a predetermined degree of deterioration (for example, the degree of deterioration corresponding to the value of ASTM color of 4.0), and that the hydraulic oil is deteriorated, the control device 37 controls the light emitter 32 to emit light to notify the user of the deterioration. The determination unit 37*a* determines that the hydraulic oil is deteriorated when the calculated ratio B/G of the blue detection value B to the green detection value G is smaller than a predetermined threshold $\alpha 2$ (for example, time ratio B/G corresponding to the value of ASTM color of 4.0, see a two-dot chain line in the drawing). Alternatively, for example, the determination unit 37*a* determines that the hydraulic oil is deteriorated when the calculated ratio R/G of the red detection value R to the green detection value G is larger than a predetermined threshold $\beta 2$ (for example, the ratio R/G corresponding to the value of ASTM color of 4.0, see a two-dot chain line in the drawing). In other words, the determination unit 37*a* of the present embodiment determines that the hydraulic oil is deteriorated when the calculated ratio B/G of the blue detection value B to the green detection unit G is smaller than the predetermined threshold $\alpha 2$ or when the calculated ratio R/G of the red detection value R to the green detection unit G is larger than the predetermined threshold $\beta 2$.

The second embodiment exhibits operational effects similar to those of the first embodiment.

In the present embodiment, the determination unit 37a determines that the hydraulic oil is deteriorated when the calculated ratio B/G of the blue detection value B to the green detection unit G is smaller than the predetermined threshold α2 or when the calculated ratio R/G of the red detection value R to the green detection unit G is larger than the predetermined threshold β2, but the present invention is not limited thereto. The determination unit 37a may determine that the hydraulic oil is deteriorated when the calculated ratio B/G of the blue detection value B to the green detection unit G is smaller than a predetermined threshold α2 and also when the calculated ratio R/G of the red detection value R to the green detection unit G is larger than the predetermined threshold β2.

In the present embodiment, the determination unit 37a determines the degree of deterioration of the hydraulic oil based on the ratio B/G of the blue detection value B to the green detection value G and also on the ratio R/G of the red detection value R to the green detection value G, but the present invention is not limited thereto. The determination unit 37a may determine the degree of deterioration of the hydraulic oil only by the ratio B/G of the blue detection value B to the green detection value G, or may determine the degree of deterioration of the hydraulic oil only by the ratio R/G of the red detection value R to the green detection value G.

In the present embodiment, the determination unit 37a determines the degree of deterioration of the hydraulic oil based on the ratio B/G of the blue detection value B to the green detection value G, but the present invention is not limited thereto. For example, the determination unit 37a may use a ratio (B+c)/G or a ratio B/(G+c) to determine the degree of deterioration of the hydraulic oil. Here, c is any number, and may be a constant or a variable. That is, the determination unit 37a may determine the degree of deterioration of the hydraulic oil based on a ratio that includes the ratio B/G. In other words, the ratio B/G of the blue detection value B to the green detection value G used by the determination unit 37a to determine the degree of deterioration of the hydraulic oil is not strictly limited to itself, but may include at least the ratio B/G, and may be appropriately modified within this range.

Similarly, in the present embodiment, the determination unit 37a determines the degree of deterioration of the hydraulic oil based on the ratio R/G of the red detection value R to the green detection value G, but the present invention is not limited thereto. For example, the determination unit 37a may use a ratio (R+c)/G or a ratio R/(G+c) to determine the degree of deterioration of the hydraulic oil. Here, c is any number, and may be a constant or a variable. That is, the determination unit 37a may determine the degree of deterioration of the hydraulic oil based on a ratio that includes the ratio R/G. In other words, the ratio R/G of the red detection value R to the green detection value G used by the determination unit 37a to determine the degree of deterioration of the hydraulic oil is not strictly limited to itself, but may include at least the ratio R/G, and may be appropriately modified within this range.

Third Embodiment

A hydraulic unit 1 of a third embodiment has the same configuration as the hydraulic unit 1 of the first embodiment except for the first color, the second color, and the third color, and the first detection value, the second detection value, and the third detection value, and the description or the first embodiment referring to FIGS. 1 to 6 is applied to the third embodiment.

A determination unit 37a of the present embodiment determines the degree of deterioration of the hydraulic oil from a ratio R/B of the red detection value R to the blue detection value B and a ratio G/B of the green detection value G to the blue detection value B. The blue in the present embodiment is an example of the first color according to the present disclosure, and the blue detection value B in the present embodiment is an example of the first detection value according to the present disclosure. The red in the present embodiment is an example of the second color according to the present disclosure, and the red detection value R in the present embodiment is an example of the second detection value according to the present disclosure. The green of the present embodiment is an example of the third color according to the present disclosure, and the green detection value G is an example of the third detection value according to the present disclosure.

Figure 10:
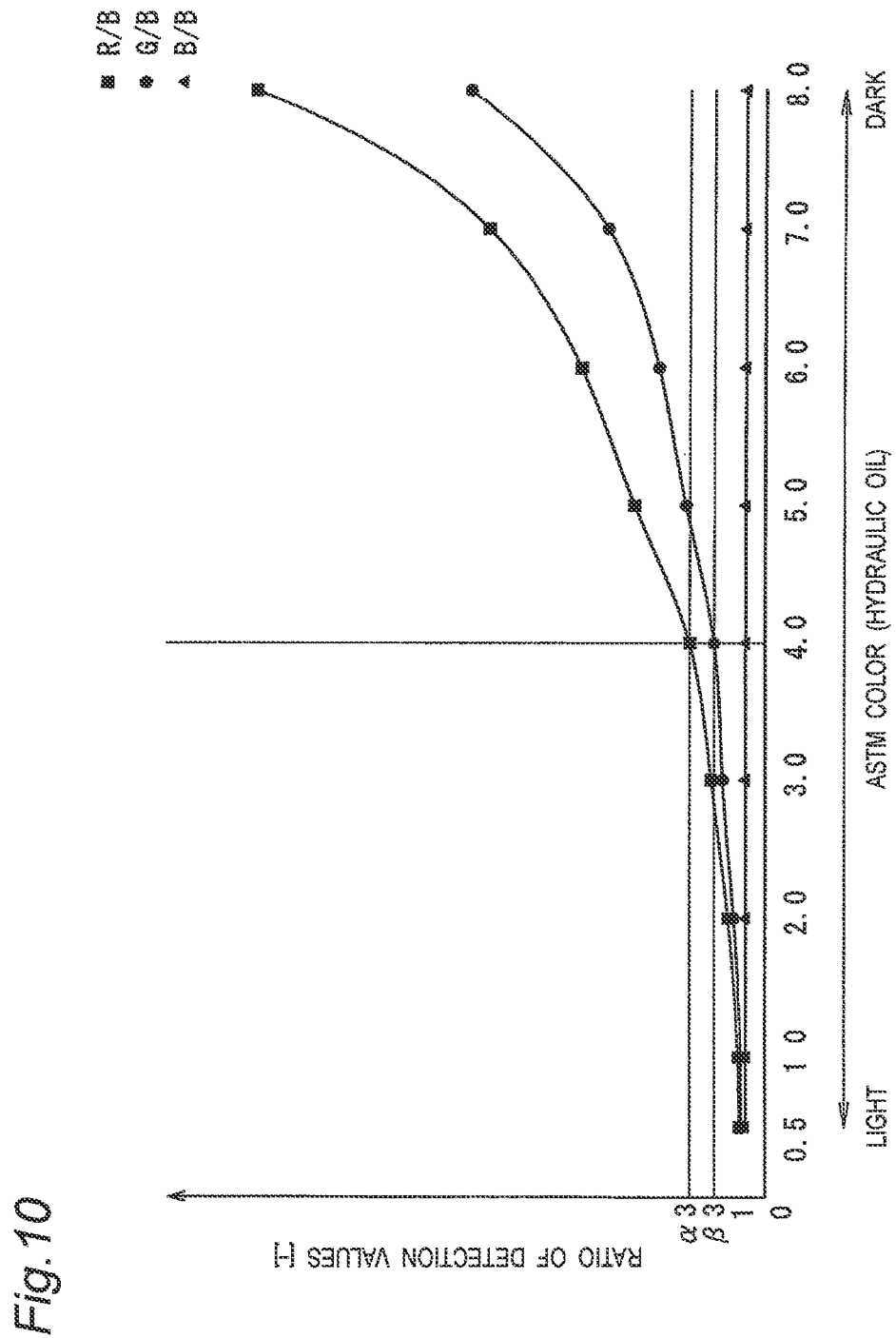
FIG. 10 is a diagram showing a relationship between a ratio of a detection value detected by a liquid sensor according to a third embodiment of the present disclosure and the ASTM color of hydraulic oil.

FIG. 10 is a diagram showing a relationship between the ratios of the red detection value R, the green detection value G, and the blue detection value B to the blue detection value B and the ASTM color of the hydraulic oil. The vertical axis in FIG. 10 indicates the ratio of each detection value to the blue detection value B. The horizontal axis in FIG. 10 indicates the ASTM color indicating the hue of the hydraulic oil. In FIG. 10, the ratio R/B of red detection value R to blue detection value B is indicated by a square mark. The ratio G/B of the blue detection value B to the blue detection value B is indicated by a circle mark. A ratio B/B of the blue detection value B to the blue detection value B is indicated by a triangle mark.

Referring to FIG. 10, the ratio R/B of the red detection value R to the blue detection value B increases generally monotonically as the value of the ASTM color increases. In other words, the ratio R/B of the red detection value R to the blue detection value B increases monotonically as the degree of deterioration of the hydraulic oil progresses. Similarly, the ratio G/B of the green detection value G to the blue detection value B increases monotonically as the value of the ASTM color increases. In other words, the ratio G/B of the green detection value G to the blue detection value B increases monotonically as the degree of deterioration of the hydraulic oil progresses. The amount of change in the ratio R/B of the red detection value R to the blue detection value B accompanying the change in the ASTM color is larger than the amount of change in the ratio G/B of the green detection value G to the blue detection value B accompanying the change in the ASTM color.

The determination unit 37a determines the degree of deterioration of the hydraulic oil based on the correspondence relationship shown in FIG. 10 between the degree of deterioration of the hydraulic oil and the ratio R/B of the red detection value R to the blue detection value B. Specifically, first, the determination unit 37a of the present embodiment calculates the ratio R/B of the red detection value R to the blue detection value B from the blue detection value B and the red detection value R output from a light receiver 33. Next, based on the correspondence relationship between the degree of deterioration of the hydraulic oil and the ratio R/B, the determination unit 37a determines the degree of deterioration of the hydraulic oil from the calculated ratio R/B.

In addition to determine the degree of deterioration of the hydraulic oil based on the ratio R/B of the red detection value R to the blue detection value B, the determination unit 37a of the present embodiment determines the degree of deterioration of the hydraulic oil based on the ratio G/B of the green detection value G to the blue detection value B. The determination unit 37a determines the degree of deterioration of the hydraulic oil based on the correspondence relationship shown in FIG. 10 between the degree of deterioration of the hydraulic oil and the ratio G/B of the green detection value G to the blue detection value B. Specifically, first, the determination unit 37a of the present embodiment calculates the ratio G/B of the green detection value G to the blue detection value B from the blue detection value B and the green detection value G output from the light receiver 33. Next, based on the correspondence relationship between the degree of deterioration of the hydraulic oil and the ratio G/B, the determination unit 37a determines the degree of deterioration of the hydraulic oil from the calculated ratio G/B.

When the determination unit 37a determines the degree of deterioration of the hydraulic oil is more than a predetermined degree of deterioration (for example, the degree of deterioration corresponding the value of ASTM color of 4.0) and that the hydraulic oil is deteriorated, the control device 37 controls the light emitter 32 to emit light to notify the user of the deterioration. The determination unit 37a determines that the hydraulic oil is deteriorated when the calculated ratio R/B of the red detection value R to the blue detection value B is larger than a predetermined threshold α3 (for example, the ratio R/B corresponding to the value of ASTM color of 4.0, see a two-dot chain line in the drawing). Alternatively, for example, the determination unit 37a determines that the hydraulic oil is deteriorated when the calculated ratio G/B of the green detection value G to the blue detection value B is larger than a predetermined threshold β3 (for example, the ratio G/B corresponding to the value of ASTM color of 4.0, see a two-dot chain line in the drawing). In other words, the determination unit 37a of the present embodiment determines that the hydraulic oil is deteriorated when the calculated ratio R/B of the red detection value R to the blue detection value B is larger than the predetermined threshold α3, or when the calculated ratio G/B of the green detection value G to the blue detection value B is larger than the predetermined threshold β3.

The third embodiment exhibits operational effects similar to those of the first embodiment.

In the present embodiment, the determination unit 37a determines that the hydraulic oil is deteriorated when the calculated ratio R/B of the red detection value R to the blue detection value B is larger than the predetermined threshold α3 or when the calculated ratio G/B of the green detection value G to the blue detection value B is larger than the predetermined threshold β3, but the present invention is not limited thereto. The determination unit 37a may determine that the hydraulic oil is deteriorated when the calculated ratio R/B of the red detection value R to the blue detection value B is larger than the predetermined threshold α3 and also when the calculated ratio G/B of the green detection value G to the blue detection value B is larger than the predetermined threshold β3.

In the present embodiment, the determination unit 37a determines the degree of deterioration of the hydraulic oil based on the ratio R/B of the red detection value R to the blue detection value B and also on the ratio G/B of the green detection value G to the blue detection value B, but the present invention is not limited thereto. The determination unit 37a may determine the degree of deterioration of the hydraulic oil only by the ratio R/B of the red detection value R to the blue detection value B, or may determine the degree of deterioration of the hydraulic oil only by the ratio G/B of the green detection value G to the blue detection value B.

In the present embodiment, the determination unit 37a determines the degree of deterioration of the hydraulic oil based on the ratio R/B of the red detection value R to the blue detection value B, but the present invention is not limited thereto. For example, the determination unit 37a may use a ratio (R+c)/B or a ratio R/(B+c) to determine the degree of deterioration of the hydraulic oil. Here, c is any number, and may be a constant or a variable. That is, the determination unit 37a may determine the degree of deterioration of the hydraulic oil based on a ratio that includes the ratio R/B. In other words, the ratio R/B of the red detection value R to the blue detection value B used by the determination unit 37a to determine the degree of deterioration of the hydraulic oil is not strictly limited to itself, but may include at least the ratio R/B, and may be appropriately modified within this range.

Similarly, in the present embodiment, the determination unit 37a determines the degree of deterioration of the hydraulic oil based on the ratio G/B of the green detection value G to the blue detection value B, but the present invention is not limited thereto. For example, the determination unit 37a may use a ratio (G+c)/B or a ratio G/(B+c) to determine the degree of deterioration of the hydraulic oil. Here, c is any number, and may be a constant or a variable. That is, the determination unit 37a may determine the degree of deterioration of the hydraulic oil based on a ratio that includes the ratio G/B. In other words, the ratio G/B of the green detection value G to the blue detection value B used by the determination unit 37a to determine the degree of deterioration of the hydraulic oil is not strictly limited to itself, but may include at least the ratio G/B, and may be appropriately modified within this range.

Fourth Embodiment

Figure 11:
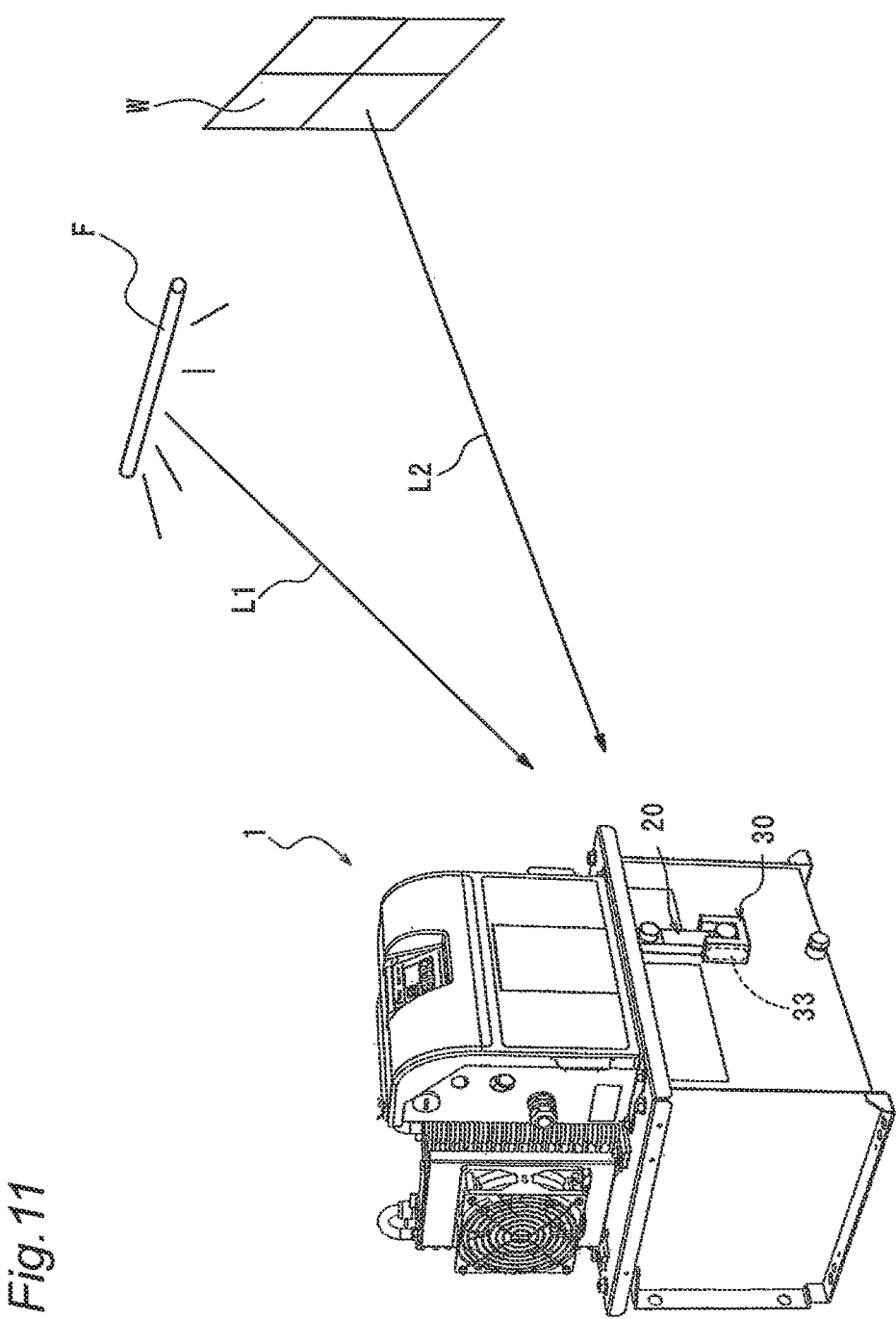
FIG. 11 is a schematic perspective view of a hydraulic unit according to a fourth embodiment of the present disclosure.

A liquid sensor 30 of a fourth embodiment has the same configuration as the liquid sensor 30 of the first embodiment except for not including a light emitter 32, and a detailed description thereof is omitted. FIG. 11 is a schematic diagram showing a state in which a hydraulic unit 1 according to the present embodiment is installed in a factory.

Referring to FIG. 11, a light receiver 33 of the present embodiment may receive light, for example, formed after light L1 of a fluorescent lamp F in the factory in which the hydraulic unit 1 is installed passed through the hydraulic oil introduced into a liquid level gauge 20. Alternatively; the light receiver 33 of the present embodiment may receive light, for example, formed after light L2 shining into the factor through a window W of the factory in which the hydraulic unit 1 is installed passed through the hydraulic oil introduced into the liquid level gauge 20. In this case, the liquid sensor 30 is preferably configured such that the casing 31 has translucency, or configured in an L shape by eliminating a portion facing the light receiver 33.

The fourth embodiment exhibits operational effects similar to those of the first embodiment.

In addition, according to the fourth embodiment, because it is not necessary to provide the light emitter, the configuration of the liquid sensor 30 can be simplified.

Fifth Embodiment

Figure 12:
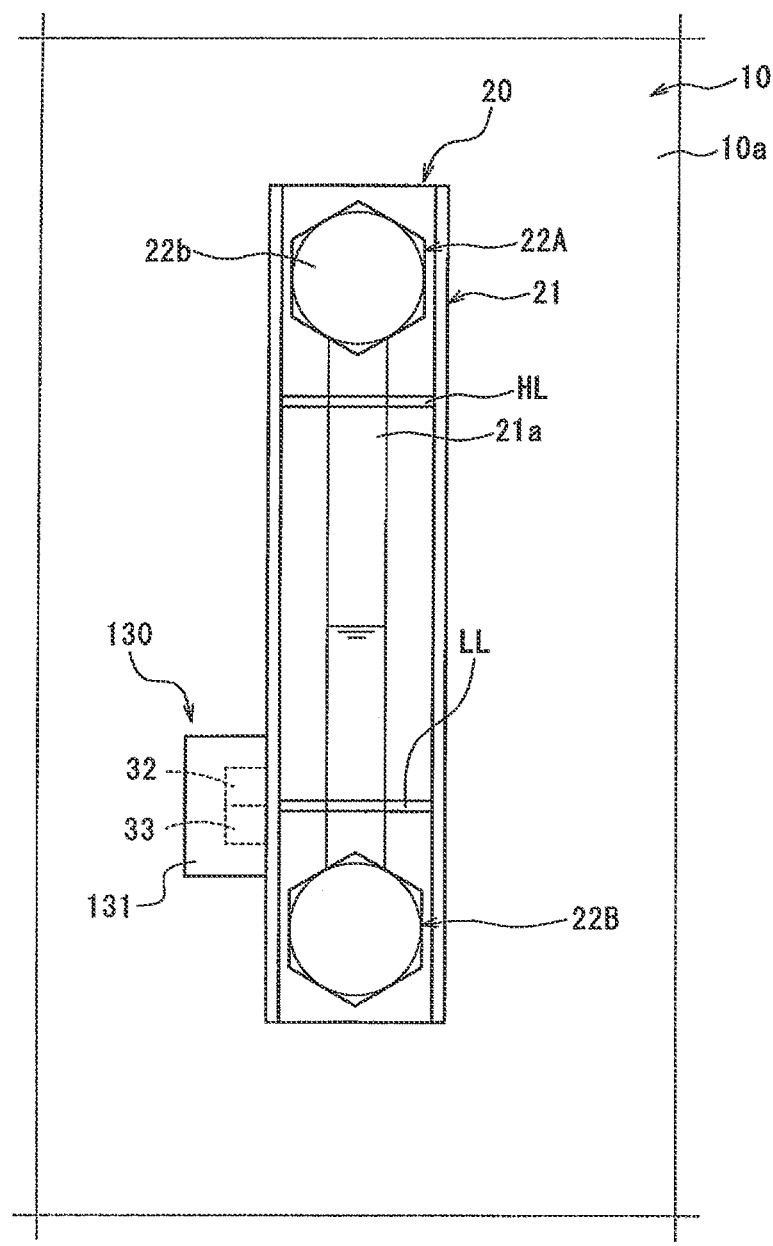
FIG. 12 is a front view of a liquid sensor according to a sixth embodiment of the present disclosure.

A liquid sensor 130 of the fifth embodiment has the same configuration as the liquid sensor 30 of the first embodiment except for being a reflective sensor, and detailed description of the same configuration is omitted. FIG. 12 is a schematic front view showing a liquid level gauge 20 and the liquid sensor 130 according to the present embodiment.

The liquid sensor 130 of the present embodiment is a reflective color sensor. As shown in FIG. 12, the liquid sensor 130 of the present embodiment includes a casing 131, a light emitter 32 that emits light, and a light receiver 33 that receives the light emitted from the light emitter 32, passing through a liquid level gauge min body 21 having translucency, and reflected by the hydraulic oil in the liquid level gauge main body 21. In the present embodiment, the light emitter 32 and the light receiver 33 are disposed on the same side with respect to the liquid level gauge main body 21.

The fifth embodiment exhibits operational effects similar to those of the first embodiment.

According to the liquid sensor 130, since the light emitter 32 and the light receiver 33 are arranged on the same side with respect to the liquid level gauge main body 21, the liquid sensor 130 can be miniaturized as compared with a case where the light emitter and the light receiver are arranged across the liquid level gauge main body 21.

In addition, since the liquid sensor 130 is the reflective sensor, it is not necessary to adjust the optical axis of the light emitter 32 and the optical axis of the light receiver 33, and it is possible to easily attach the liquid sensor 130 to the liquid level gauge 20.

Although the embodiments have been described above, it will be understood that various changes in form and details can be made without departing from the spirit and scope of the claims.

For example, in the first to fifth embodiments, the liquid sensor 30 determines the degree of deterioration of the hydraulic oil of the hydraulic unit 1, but the present invention is not limited thereto, and the degree of deterioration of another liquid such as cutting liquid or coolant may be determined. In addition, the liquid sensor 30 may determine a state in which another liquid is mixed in the hydraulic oil.

For example, the first to fifth embodiments may be appropriately combined and used.

In the first embodiment to the fifth embodiment, the first color, the second color, and the third color according to the present disclosure are any one of red, green, and blue, but the colors are not limited thereto, and may be other colors such as yellow or purple. That is, in the first to fifth embodiments, a combination of red, green, and blue is used as the combination of the first to third colors according to the present disclosure, but the combination is not limited thereto, and for example, a combination of magenta, yellow, and cyan may be used.

In addition, in the first to fifth embodiments, the liquid level gauge 20 being an example of the accommodation unit of the present disclosure includes the liquid level gauge main body 21 having a substantially rectangular parallelepiped shape, but the present invention is not limited thereto. For example, the liquid level gauge 20 being an example of the accommodation unit of the present disclosure may include a liquid level gauge main body in which a cross-sectional shape in a cross section orthogonal to the longitudinal direction is a semicircular shape.

The invention claimed is:

1. A liquid deterioration determination device comprising:
a liquid level gauge into which a liquid is introduced and that has translucency;
a casing attached to an outside of the liquid level gauge;
a light receiver provided integrally within the casing and configured to receive
detection light transmitted through a liquid introduced from a liquid tank of an external device or
detection light reflected by the liquid; and
an electronic control device configured to be operatively connected to the external device to determine a degree of deterioration of the liquid when the external device is in a stable operation state,
the light receiver being configured to output
a first detection value representing an amount of a light component of a first color included in the detection light transmitted through the liquid or the detection light reflected by the liquid and
a second detection value representing an amount of a light component of a second color included in the detection light transmitted through the liquid or the detection light reflected by the liquid, the second color being different from the first color,
the electronic control device being configured to determine the degree of deterioration of the liquid based on a ratio of the second detection value to the first detection value when the external device is in the stable operation state, and
the stable operation state of the external device being determined by referring to an operation time or a temperature rise of the liquid after starting an operation of the external device.

2. The liquid deterioration determination device according to claim 1, further comprising:
a light emitter configured to emit the detection light to the liquid,
the light receiver being configured to receive the detection light emitted from the light emitter and transmitted through the liquid or reflected by the liquid.

3. The liquid deterioration determination device according to claim 1, wherein
the light receiver is configured to output a third detection value representing an amount of a light component of a third color included in the detection light transmitted through the liquid or the detection light reflected by the liquid, the third color being different from the first color and the second color, and
the electronic control device is configured to determine the degree of deterioration of the liquid based on both the ratio of the second detection value to the first detection value and
a ratio of the third detection value to the first detection value.

4. The liquid deterioration determination device according to claim 3, wherein
each of the first color, the second color, and the third color is any one of red, green, and blue.

5. The liquid deterioration determination device according to claim 4, wherein
the first color is red.

6. A hydraulic unit including the liquid deterioration determination device according to claim 1.

* * * * *